United States Patent
Murata et al.

(10) Patent No.: US 12,388,491 B1
(45) Date of Patent: Aug. 12, 2025

(54) SYSTEM AND METHOD FOR CANCELING SIGNAL SOURCE NOISE WHEN MEASURING RESIDUAL NOISE OF A DEVICE UNDER TEST (DUT)

(71) Applicant: Keysight Technologies, Inc., Santa Rosa, CA (US)

(72) Inventors: Koji Murata, Hyogo (JP); Yusuke Taii, Kobe (JP); Yasuki Nanamori, Kobe (JP); Hiroaki Ugawa, Kobe (JP)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 26 days.

(21) Appl. No.: 18/426,531

(22) Filed: Jan. 30, 2024

(51) Int. Cl.
*H04B 3/46* (2015.01)
*H04B 17/00* (2015.01)
*H04B 17/20* (2015.01)
*H04B 17/21* (2015.01)

(52) U.S. Cl.
CPC ........... *H04B 3/46* (2013.01); *H04B 17/0085* (2013.01); *H04B 17/204* (2023.05); *H04B 17/21* (2015.01)

(58) Field of Classification Search
CPC .......... H04B 3/46; H04B 3/462; H04B 3/466; H04B 3/48; H04B 17/00; H04B 17/21; H04B 17/22; H04B 17/204; H04B 17/203; H04B 17/201; H04B 17/0085; H04B 17/0082
See application file for complete search history.

(56) References Cited

U.S. PATENT DOCUMENTS

| | | | |
|---|---|---|---|
| 7,227,346 B1 | 6/2007 | Solbrig | |
| 8,248,297 B1 | 8/2012 | Baker et al. | |
| 11,664,909 B1* | 5/2023 | Mohindra | H03L 7/08 |
| | | | 375/226 |
| 2008/0100847 A1* | 5/2008 | Szafraniec | G01B 9/02004 |
| | | | 356/477 |
| 2013/0197848 A1* | 8/2013 | Sariaslani | G01R 29/26 |
| | | | 702/121 |

(Continued)

FOREIGN PATENT DOCUMENTS

CN 103197160 A 7/2013

OTHER PUBLICATIONS

English translation of CN103197160A, published Jul. 10, 2013, 6 pgs.

(Continued)

*Primary Examiner* — Khanh C Tran

(57) ABSTRACT

A system for canceling signal source noise when measuring residual noise of a DUT includes a signal source for generating an RF signal having signal source noise; a signal splitter for dividing the RF signal into first and second RF signals in first and second paths, the first path including the DUT which outputs a DUT signal in response to the first RF signal; a first receiver for receiving the DUT and second RF signals, compensating for a delay difference and eliminating the signal source noise to output a delay compensated first signal without the signal source noise; a second receiver receiving the DUT and second RF signals, compensating for a delay difference and eliminating the signal source noise to output a delay compensated second signal without the signal source noise; and a processor for performing cross-correlation of the delay compensated first and second signals for measuring the residual noise.

18 Claims, 11 Drawing Sheets

(56) References Cited

U.S. PATENT DOCUMENTS

2014/0159808 A1* 6/2014 Acimovic ............ G06F 30/367
716/122
2019/0086471 A1 3/2019 Aouini et al.

OTHER PUBLICATIONS

C.W. Nelson et al., "A Sub-Sampling Digital PM/AM Measurement System," 2012 IEEE International Frequency Control Symposium Proceedings, Baltimore, MD, USA, 2012, pp. 1-4.

* cited by examiner

SYSTEM AND METHOD FOR CANCELING SIGNAL SOURCE NOISE WHEN MEASURING RESIDUAL NOISE OF A DEVICE UNDER TEST (DUT)

BACKGROUND

During testing of a device under test (DUT), the DUT may be configured to output a test signal in response to a stimulate signal provided by a signal source. When measuring the residual noise of the DUT, phase noise and amplitude modulation (AM) noise of the signal source must be canceled in order to measure only noise introduced by the DUT itself. Generally, cancelation of the phase noise and the AM noise of the signal source is done by subtracting the source signal generated by the signal source, including the phase noise and the AM noise, from DUT output signal in the frequency domain (or multiplying in the time domain).

To minimize degradation of the cancelation, the delay difference between the two paths must be minimized, for example, by adjusting the cable length of one or both paths, or by inserting a variable delay line in one or both paths. Both adjusting the cable length(s) and inserting variable delay line(s) are difficult and time-consuming procedures, requiring iterative observations of the source noise at a phase detector and changing electrical delay as required. The result of adjusting the delay is usually not sufficient for low noise measurements.

Also, path delay may be calculated by the electrical length of cables used, but such calculations do not provide sufficient accuracy. Using test instruments, such as a vector network analyzer (VNA), it is possible to measure delay accurately, but it requires reconnection of devices and cables. Another problem is that delay measurement by a VNA is not performed under the condition of residual noise measurement. Factors such as source and load matching, input power and nonlinearity of the DUT will cause error in the delay measured by the VNA.

BRIEF DESCRIPTION OF THE DRAWINGS

The example embodiments are best understood from the following detailed description with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
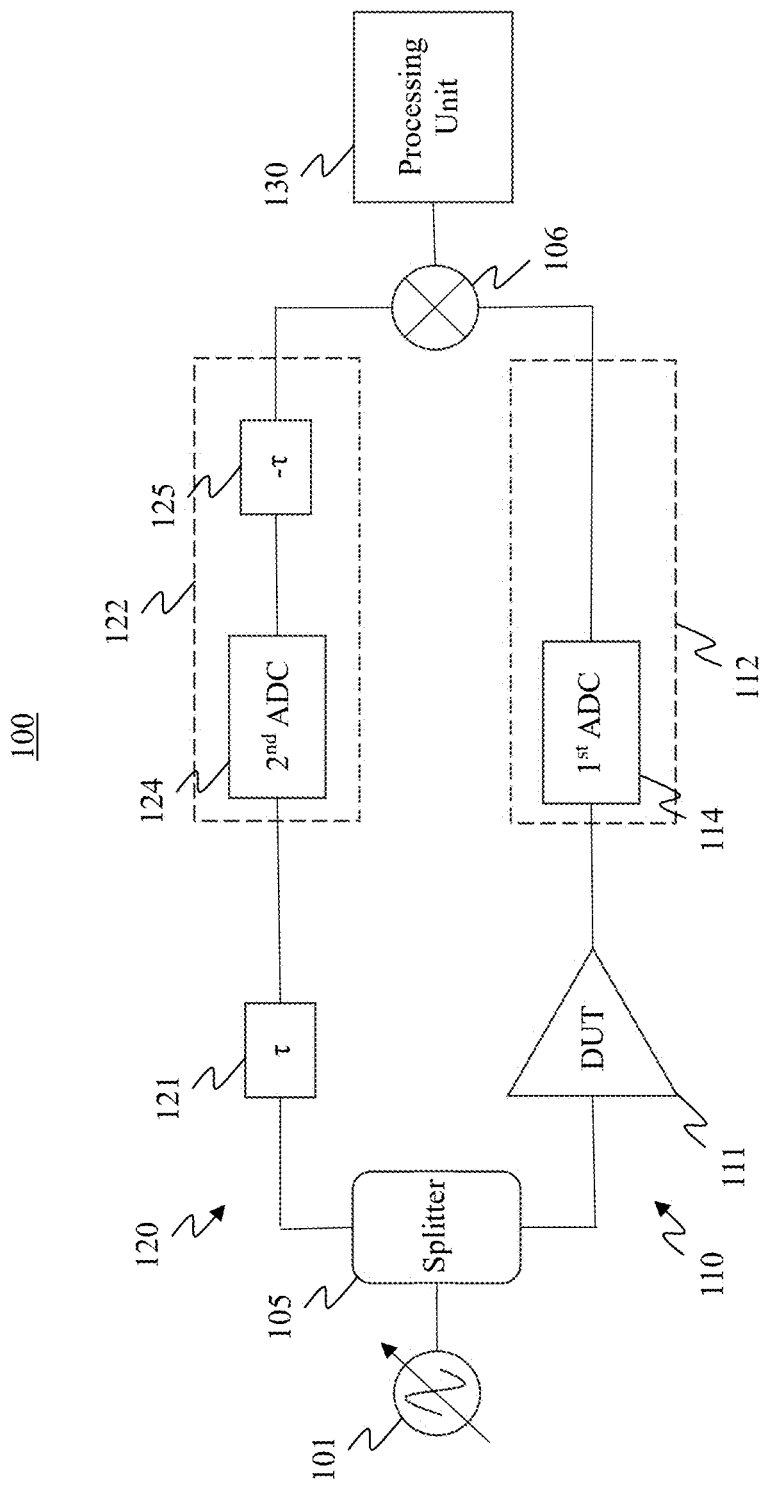
FIG. 1 is a simplified block diagram of a system for canceling signal source noise when measuring residual noise of a DUT, including digital demodulation, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

The various embodiments are in the technical field of measuring and testing electrical devices, and are directed more particularly to measuring residual noise of a DUT and canceling phase noise and AM noise of a signal source when measuring the residual noise of the DUT. More particularly, the various embodiments accurately compensate for delay differences between two paths, and cancel noises from the signal source sufficiently without using physical and/or electrical adjustments of the test system.

According to a representative embodiment, a system is provided for canceling signal source noise when measuring residual noise of a DUT. The system includes a signal source, a signal splitter, a path delay compensator, a subtractor, and a processor. The signal source is configured to generate a radio frequency (RF) signal having signal source noise, and to selectively generate a phase modulation signal to provide a phase modulated RF signal for initially performing a calibration of the system including the DUT. The signal splitter is configured to divide the RF signal into a first RF signal in a first path and a second RF signal in a second path, where the first path introduces a first path delay, and includes the DUT configured to receive the first RF signal as a stimulus signal and to output a DUT signal in response; a first analog to digital converter (ADC) configured to digitize the DUT signal; and a first demodulator configured to demodulate the digitized DUT signal to provide a demodulated digitized DUT signal including the signal source noise of the RF signal and the residual noise of the DUT, and where the second path introduces a second path delay, and includes a second ADC configured to digitize the second RF signal; and a second demodulator configured to demodulate the digitized second RF signal to provide a demodulated digitized second RF signal. The path delay compensator is configured to compensate for a delay difference between the first path delay and the second path delay. The subtractor is configured to subtract the demodulated digitized DUT signal and the demodulated digitized second RF signal following the compensation for the delay difference to output a delay compensated signal including the residual noise of the DUT without the signal source noise. The processor is configured to initially perform the calibration of the system in response to the phase modulated RF signal with the DUT in the first path to determine the delay difference between the first path delay and the second path delay, and subsequently to measure the residual noise of the DUT from the delay compensated signal using the delay difference.

According to another representative embodiment, a system is provided for canceling signal source noise when measuring residual noise of a DUT. The system includes a signal source, a signal splitter, a first receiver unit, a second receiver unit and a processor. The signal source is configured to generate an RF signal having signal source noise. The signal splitter is configured to divide the RF signal into a first RF signal in a first path and a second RF signal in a second path, where the first path introduces a first path delay and the second path introduces a second path delay, and where the first path includes the DUT configured to receive the first RF signal as a stimulus signal and to output a DUT signal in response. The first receiver unit includes a third path configured to receive the DUT signal from the first path and a fourth path configured to receive the second RF signal from the second path, where the third path introduces a third path delay and the fourth path introduces a fourth path delay, and where the first receiver unit is configured to compensate for a delay difference between a sum of the first and third path delays and a sum of the second and fourth path delays and to eliminate the signal source noise to output a delay compensated first signal including first residual noise of the DUT without the signal source noise. The second receiver unit includes a fifth path configured to receive the DUT signal from the first path and a sixth path configured to receive the second RF signal from the second path, where the fifth path introduces a fifth path delay and the sixth path introduces a sixth path delay, and where the second receiver unit is configured to compensate for a delay difference between a sum of the first and fifth path delays and a sum of the second and sixth path delays and to eliminate the signal source noise to output a delay compensated second signal including second residual noise of the DUT without the signal source noise. The processor is configured to perform cross-correlation of the delay compensated first signal and the delay compensated second signal, and to measure the residual noise of the DUT from the cross-correlated signal.

According to another representative embodiment, a method is provided for canceling signal source noise when measuring residual noise of a DUT. The method includes generating an RF signal having signal source noise using a signal source; dividing the RF signal into a first RF signal in a first path and a second RF signal in a second path, where the first path introduces a first path delay and the second path introduces a second path delay; receiving the first RF signal as a stimulus signal at the DUT in the first path, where the DUT outputs a DUT signal in response; receiving the DUT signal at a third path and the second RF signal at a fourth path of a first receiver unit, where the third path introduces a third path delay and the fourth path introduces a fourth path delay; converting a frequency of the DUT signal using a first local oscillator (LO) signal generated by a first LO to a first frequency converted DUT signal, and a frequency of the second RF signal using the first LO signal to a first frequency converted RF signal, where the first LO introduces first LO noise; compensating for a delay difference between a sum of the first and third path delays and a sum of the second and fourth path delays and eliminate the signal source noise to output a delay compensated first signal including first residual noise of the DUT without the signal source noise; receiving the DUT signal at a fifth path and the second RF signal at a sixth path of a second receiver unit, where the fifth path introduces a fifth path delay and the sixth path introduces a sixth path delay; converting a frequency of the DUT signal using a second LO signal generated by a second LO to a second frequency converted DUT signal, and a frequency of the second RF signal using the second LO signal to a second frequency converted RF signal, where the second LO introduces second LO noise; compensating for a delay difference between a sum of the first and fifth path delays and a sum of the second and sixth path delays and eliminate the signal source noise to output a delay compensated second signal including second residual noise of the DUT without the signal source noise; performing cross-correlation of the delay compensated first signal and the delay compensated second signal, eliminating the first and second LO noise; and outputting the cross-correlated signal as the residual noise of the DUT.

FIG. 1 is a simplified block diagram of a system for canceling signal source noise when measuring residual noise of a DUT, according to a representative embodiment.

Referring to FIG. 1, test system 100 is configured to perform residual noise measurements of a DUT 111, and to cancel signal source noise introduced by signal source 101 from the residual noise measurements. The signal source noise may include phase noise and amplitude modulation (AM) noise of the signal source 101, for example. The signal source 101 may be a signal generator, a direct digital synthesizer (DDS) or an arbitrary waveform generator (AWG), for example, configured to generate a radio frequency (RF) signal as a stimulus signal to be input to the DUT 111. Of course, other types of signal generators may be incorporated as the signal source 101 without departing from the scope of the present teachings. As discussed above, the RF signal has source noise, including phase noise and/or AM noise, introduced by the signal source 101, which must be eliminated in order to accurately measure noise of the DUT 111.

The test system 100 includes a signal splitter 105 configured to divide the RF signal into multiple paths. The signal splitter 105 may be a power divider, for example. In the depicted embodiment, the signal splitter 105 divides the RF signal into a first RF signal input to a first path 110 and a second RF signal input to a second path 120. For purposes of illustration, the DUT 111 is shown in the first path 110, where the DUT 111 receives the first RF signal as a stimulus signal and outputs the DUT signal in response.

The test system 100 further includes a first receiver 112 in the first path 110 that receives the DUT signal output by the DUT 111, and a second receiver 122 in the second path 120 that receives the second RF signal. The first receiver 112 includes a first analog to digital converter (ADC) 114 configured to digitize the DUT signal to output a digitized DUT signal. The second receiver 122 includes a second ADC 124 configured to digitize the second RF signal to output a digitized second RF signal.

A demodulator 106 demodulates the digitized DUT signal to baseband in response to a demodulation signal, for which the digitized second RF signal is used. This results in the demodulator 106 effectively subtracting the demodulated digitized DUT signal from the first path 110 and the demodulated digitized second RF signal from the second path 120 to eliminate the signal source noise from the DUT signal, enabling accurate measurement of the residual noise introduced by the DUT 111. However, a delay difference between the first and second paths 110 and 120 must be compensated for. That is, the first path 110 introduces a first path delay in the DUT signal, and the second path 120 introduces a second path delay in the second RF signal, where the first path delay and the second path delay are different from one another. For the sake of convenience, the first path delay is assumed to be zero, such that the second path delay, indicated by path delay 121, is equal to the delay difference ($\tau$). The second path 120 therefore further includes a path delay compensator 125 configured to compensate for the delay difference between the first path delay and the second path delay by effectively subtracting out the path delay 121 (delay difference ($-\tau$)) prior to the subtraction performed by the demodulator 106. Of course, in various alternative configurations, the path delay compensator 125 alternatively may be included in the first path 110 following the first ADC 114, or the functionality of the path delay compensator 125 may be split between the first and second paths 110 and 120, without departing from the scope of the present teachings. The demodulator 106 outputs a delay compensated signal including the residual noise of the DUT 111 without the signal source noise.

A processing unit 130 (e.g., digital signal processor) is configured to measure the residual noise of the DUT 111 in the delay compensated signal received from the demodulator 106. An example of the processing unit 130 is discussed below in detail with reference to FIG. 10.

More particularly, with reference to FIG. 1, the RF signal output by the signal source 101 may be indicated by Expression (1), where $\omega=2\pi f$ where f is carrier frequency of the RF signal, $\omega_m=2\pi f_m$ where $f_m$ is offset frequency from the carrier frequency of the RF signal, and Oss is phase noise of the RF signal:

$$\sin(\omega t+\phi_{ss} \sin \omega_m t) \quad (1)$$

The digitized DUT signal output by the first ADC 114 in the first path 110 may be indicated by Expression (2), where $\phi_{DUT}$ is phase noise of the digitized DUT signal:

$$\sin(\omega t+\phi_{ss} \sin \omega_m t+\phi_{DUT} \sin \omega_m t) \quad (2)$$

The digitized second RF signal output by the second ADC 124 in the second path 120 may be indicated by Expression (3), where t is the delay difference between the first and second paths 110 and 120, indicated by the path delay 121 as discussed above:

$$\sin(\omega(t-\tau)+\phi_{ss} \sin \omega_m(t-\tau)) \quad (3)$$

The value of the delay difference t may be determined during calibration of the test system 100, as discussed below.

As mentioned above, the path delay compensator 125 compensates for the delay difference between the first and second path delays by effectively subtracting out the path delay 121 in the second path 120. Therefore, after the path delay compensator 125, the digitized second RF signal may be indicated by Expression (4), which has been compensated for the delay difference t:

$$\sin(\omega t+\phi_{ss} \sin \omega_m t) \quad (4)$$

The demodulator 106 demodulates the digitized DUT signal indicated by Expression (2) to baseband in response to a demodulation signal, which is provided as the delay compensated digitized second RF signal indicated by Expression (4). Accordingly, the demodulation by the demodulator 106 effectively performs subtraction of the demodulated digitized DUT signal and the demodulated delay compensated digitized second RF signal to provide the delay compensated signal, which includes the residual noise of the DUT without the signal source noise, indicated by Expression (5):

$$\Phi_{DUT} \sin \omega_m t \quad (5)$$

In an embodiment, each of the first and second receivers may perform digital demodulation of the digitized DUT and second RF signals, respectively, as part of a practical implementation. In this context, FIG. 2 is a simplified block diagram of a system for canceling signal source noise when measuring residual noise of a DUT, including digital demodulation, according to a representative embodiment.

Figure 2:
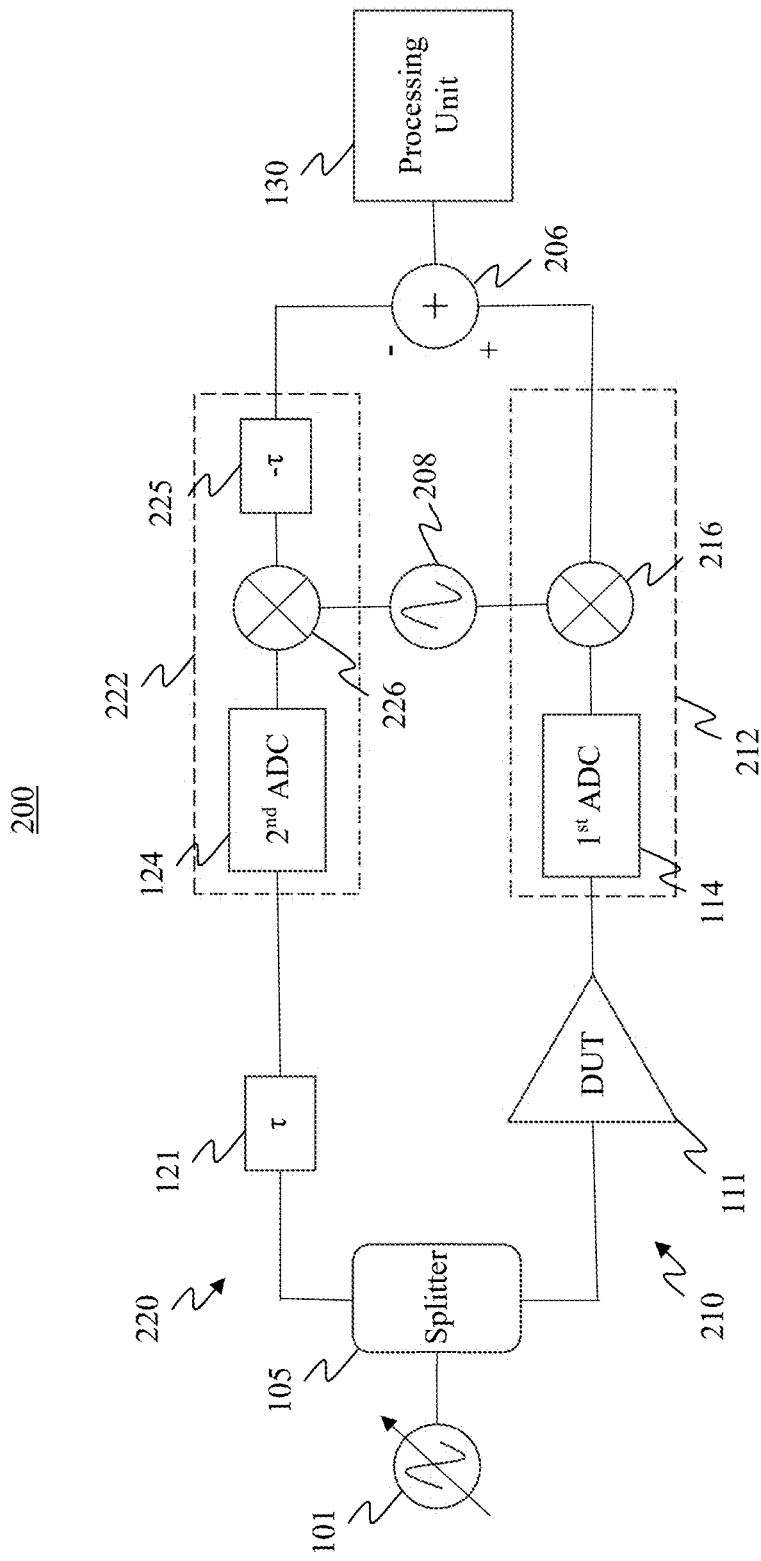
FIG. 2 is a simplified block diagram of a system for canceling signal source noise when measuring residual noise of a DUT, including digital demodulation, according to a representative embodiment.

Referring to FIG. 2, test system 200 is configured to perform residual noise measurements of a DUT 111, and to cancel signal source noise introduced by signal source 101 from the residual noise measurements. The test system 200 has a first path 210 including a first receiver 212 and a second path 220 including a second receiver 222. The test system 200 is substantially the same as the test system 100, discussed above, with the addition of a signal oscillator 208, a first demodulator 216 in the first receiver 212 and second demodulator 226 in the second receiver 222, and replacing the demodulator 106 with a subtractor 206, described below. The signal oscillator 208 may be a numerically controlled oscillator (NCO), for example, configured to generate a demodulation signal to be applied to both the first and second receivers 212 and 222.

The first demodulator 216 in the first receiver 212 demodulates the digitized DUT signal to baseband in response to the demodulation signal, and the second demodulator 226 in the second receiver 222 demodulates the digitized second RF signal to baseband in response to the demodulation signal. The first and second demodulators 216 and 226 may be mixers, for example, although any type of demodulation may be implemented without departing from the scope of the present teachings.

In addition, the test system 200 includes path delay compensator 225 in place of the path delay compensator 125 for effectively subtracting out the path delay 121. That is, the path delay compensator 225 is configured to effectively subtract out the path delay 121 by calculating compensation phase $\theta$ according to $\theta = 2\pi f_m T$, where $f_m$ is offset frequency from the carrier frequency of the RF signal and t is the delay difference between the first and second path delays, as discussed above, and subtracting the compensation phase $\theta$ from the demodulated digitized second RF signal to provide the delay compensated digitized second RF signal. Again, the path delay 121 and the path delay compensator 225 are indicated in the second path 220 for the sake of convenience. Of course, the path delay compensator 225 alternatively may be included in the first path 210 following the first ADC 114, or the functionality of the path delay compensator 225 may be split between the first and second paths 210 and 220, without departing from the scope of the present teachings.

The test system 200 includes the subtractor 206 configured to provide the difference between the demodulated digitized DUT signal from the first path 210 and the demodulated second RF signal from the second path 220, after the delay compensation between the first and second paths 210 and 220. Descriptions of the remaining elements in FIG. 2 with the same reference numbers as in FIG. 1 will not be repeated, for ease of explanation.

In FIG. 2, the digitized DUT signal output by the first ADC 114 in the first path 210 may be indicated by Expression (2), and the digitized second RF signal output by the second ADC 124 in the second path 220 likewise may be indicated by Expression (3), discussed above. However, the first demodulator 216 in the first receiver 212 demodulates the digitized DUT signal, and the second demodulator 226 in the second receiver 222 demodulates the digitized second RF signal. Accordingly, the demodulated digitized DUT signal output by the first demodulator 216 may be indicated by Expression (6):

$$\phi_{ss} \sin \omega_m t + \phi_{DUT} \sin \omega_m t \qquad (6)$$

Also, the demodulated digitized second RF signal output by the second demodulator 226 in the second path 220 may be indicated by Expression (7);

$$\phi_{ss} \sin \omega_m (t-\tau) \qquad (7)$$

The path delay compensator 225 compensates for the delay difference between the first and second path delays by effectively subtracting out the path delay 121 in the second path 220 by calculating the compensation phase $\theta$ and subtracting it from the demodulated digitized second RF signal, as discussed above, to provide the delay compensated digitized second RF signal. Therefore, after the path delay compensator 225, the delay compensated demodulated digitized second RF signal may be indicated by Expression (8), which has been compensated for the delay difference $\tau$:

$$\phi_{ss} \sin \omega_m t \qquad (8)$$

The subtractor 206 effectively subtracts the delay compensated, demodulated digitized second RF signal indicated by Expression (8) from the demodulated digitized DUT signal indicated by Expression (6) to provide the delay compensated signal, indicated by Expression (5), discussed above. The delay compensated signal includes the residual noise of the DUT without the signal source noise.

In an embodiment, the second path 220 may further include another DUT (not shown) before the second ADC 124. In this case, the another DUT is configured to receive the second RF signal as a stimulus signal and to output another DUT signal in response. The another DUT signal is input to the second ADC 124, which outputs a second DUT signal as the second RF signal, which is treated in the same manner as discussed above.

In another embodiment, each of the first and second receivers may perform frequency conversion (e.g., frequency down-conversion) of the DUT signal and the second RF signal before digitization and demodulation, respectively, as part of another practical implementation. In this context, FIG. 3 is a simplified block diagram of a system for canceling signal source noise when measuring residual noise of a DUT, including frequency conversion and digital demodulation, according to a representative embodiment.

Figure 3:
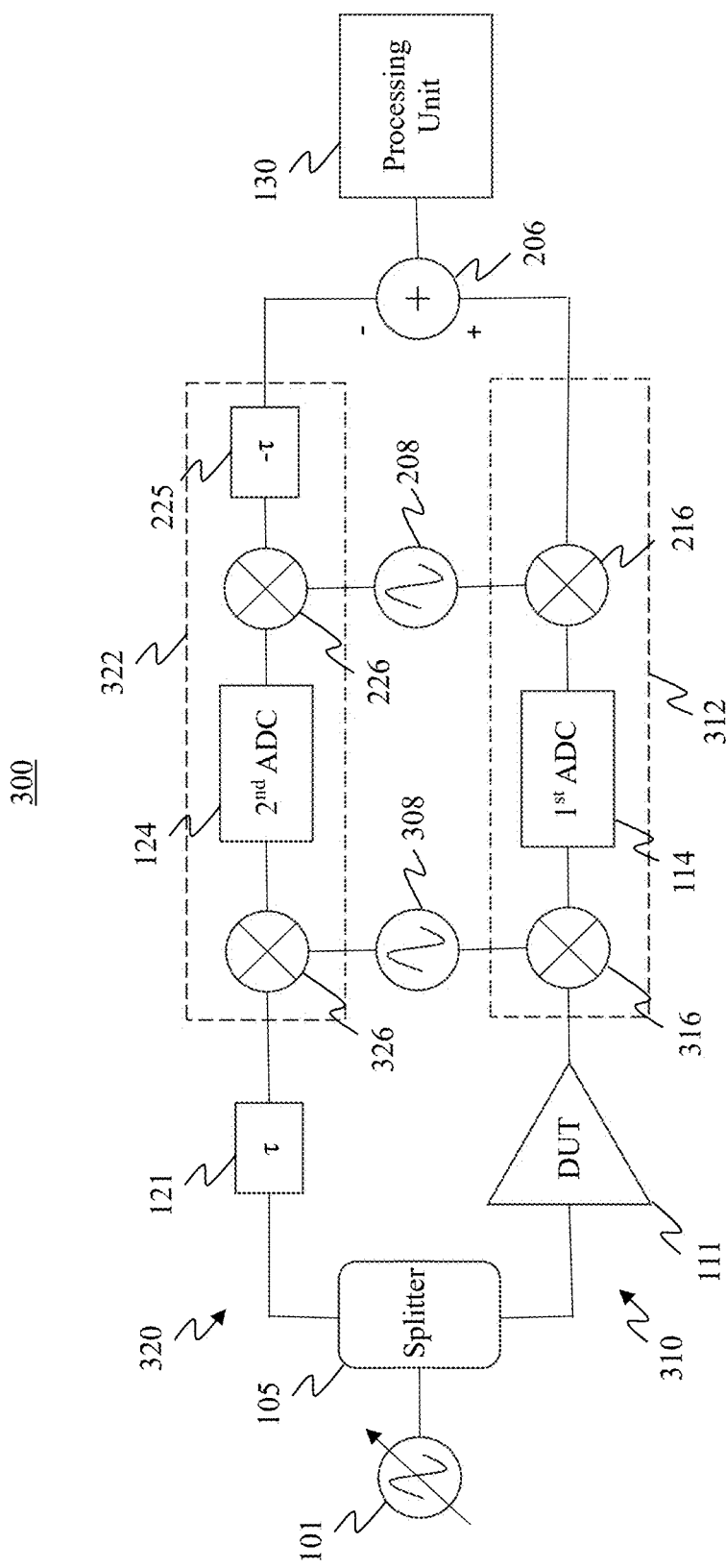
FIG. 3 is a simplified block diagram of a system for canceling signal source noise when measuring residual noise of a DUT, including frequency conversion and digital demodulation, according to a representative embodiment.

Referring to FIG. 3, test system 300 is configured to perform residual noise measurements of a DUT 111, and to cancel signal source noise introduced by signal source 101 from the residual noise measurements. The test system 300 has a first path 310 including a first receiver 312 and a second path 320 including a second receiver 322. The test system 300 is substantially the same as the test system 200, discussed above, with the addition of a local oscillator (LO) 308, a first frequency converter 316 in the first receiver 312, and second frequency converter 326 in the second receiver 322. The LO 308 is configured to generate an LO signal to be applied to both the first and second receivers 312 and 322.

The first frequency converter 316 in the first receiver 312 converts the frequency of the DUT signal to an intermediate frequency in response to the LO signal prior to digitization, and second frequency converter 326 in the second receiver 322 converts the frequency of the second RF signal to the intermediate frequency in response to the LO signal prior to digitization, where the intermediate frequency is more manageable for the first and second ADCs 114 and 124 than the RF frequency of the RF signal. In an embodiment, the first and second frequency converters 316 and 326 are mixers configured to perform frequency down-conversion of the DUT signal and the second RF signal respectively. However, any type of frequency conversion may be implemented without departing from the scope of the present teachings.

The frequency converted DUT signal is digitized by the first ADC 114, and the digitized DUT signal is demodulated to baseband by the first demodulator 216 in the first receiver 312, as discussed above. The frequency converted second RF signal is digitized by the second ADC 124, and the digitized second RF signal is demodulated to baseband by the second demodulator 226 in the second receiver 322, as discussed above. Also, the second path 320 includes a path delay compensator 225 configured to compensate for the delay difference between the first path delay and the second path delay by effectively subtracting out the path delay 121 (delay difference (−τ)), as discussed above with reference to FIG. 2. Again, the path delay compensator 225 alternatively may be included in the first path 310 following the first ADC 114, or the functionality of the path delay compensator 225 may be split between the first and second paths 310 and 320, without departing from the scope of the present teachings. The subtractor 206 effectively subtracts the delay compensated, demodulated digitized second RF signal from the demodulated digitized DUT signal to provide the delay compensated signal, indicated by Expression (5), discussed above.

In configuration shown in FIG. 3, the path delay compensation has a side effect in that the LO 308 introduces LO noise, the cancellation of which is impaired by the delay added by the path delay compensator 225. In comparison, without the compensation provided by the path delay compensator 225, the LO noise introduced by the LO 308 may be sufficiently canceled by careful internal design. In order to reduce or eliminate the uncanceled LO noise caused as a side effect of the path delay compensation, cross-correlation may be performed, as discussed below.

Figure 4:
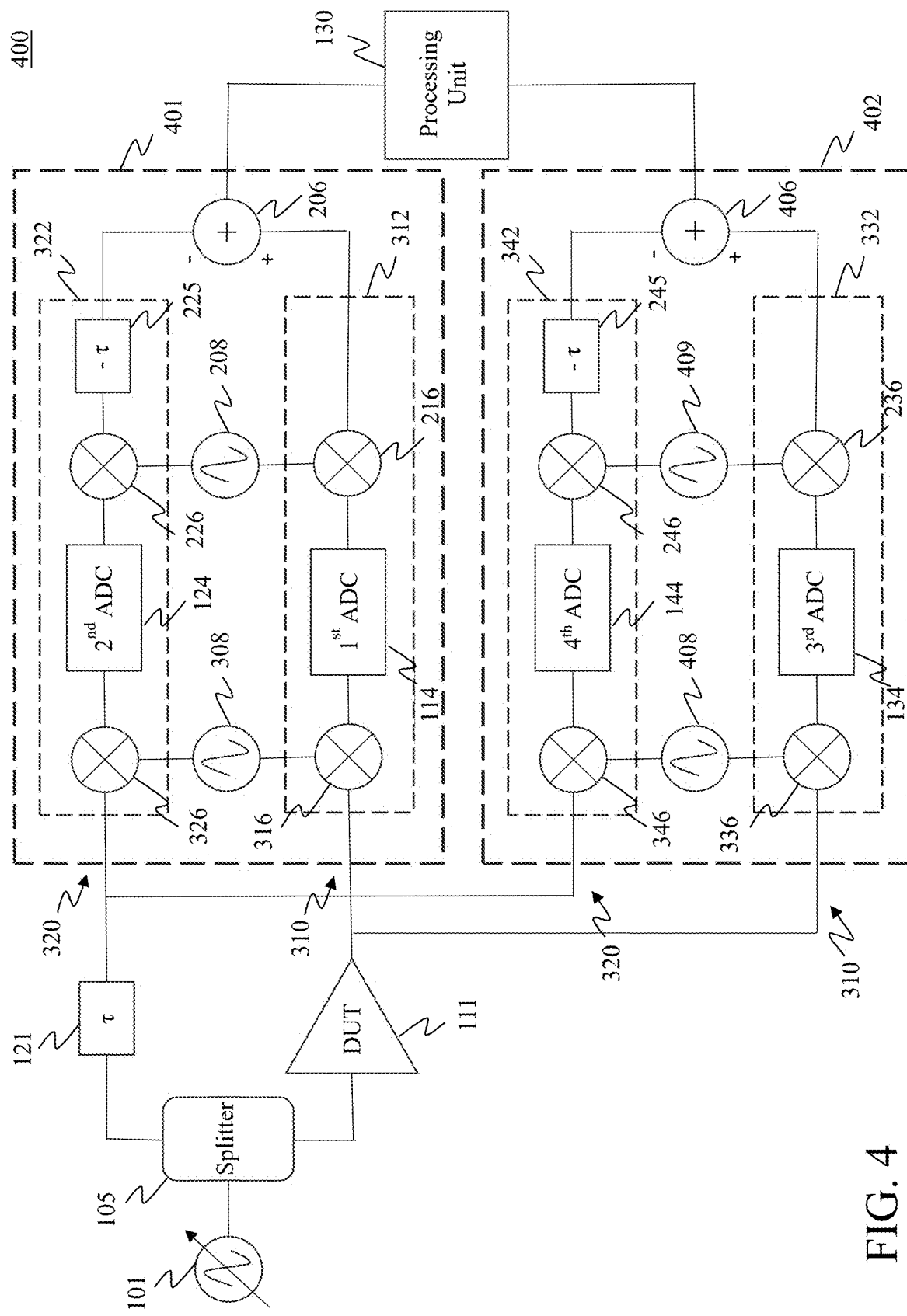
FIG. 4 is a simplified block diagram of a system for canceling signal source noise when measuring residual noise of a DUT, including frequency conversion, digital demodulation and cross-correlation, according to a representative embodiment.

That is, FIG. 4 is a simplified block diagram of a system for canceling signal source noise when measuring residual noise of a DUT, including frequency conversion, digital demodulation and cross-correlation, according to a representative embodiment. The cross-correlation may be performed by implementing two identical receiver units.

Referring to FIG. 4, test system 400 is configured to perform residual noise measurements of a DUT 111, and to cancel signal source noise introduced by signal source 101 from the residual noise measurements, and to eliminate uncanceled LO noise introduced by first LO 308 and second LO 408, discussed below. The test system 400 includes the signal splitter 105 configured to divide the RF signal output by the signal source 101 into a first path 410 and a second path 420, where the DUT 111 is located in the first path 410. The first path 410 introduces a first path delay in the DUT signal e, and the second path 420 introduces a second path delay in the second RF signal, as discussed above. The test system 400 further includes a first receiver unit 401 and a second receiver unit 402 in both the first path 410 and the second path 420, where the first and second receiver units 401 and 402 are substantially the same. That is, the first receiver unit 401 includes first receiver 312 and the second receiver unit 402 includes third receiver 332 that are substantially the same as the first receiver 312 in test system 300, and the first receiver unit 401 includes second receiver 322 and the second receiver unit 402 includes fourth receiver 342 that are substantially the same as the second receiver 322 in the test system 300, discussed above.

More particularly, the first receiver unit 401 includes first LO 308 for generating an LO signal and first signal oscillator 208 for generating a demodulation signal for demodulators in the first and second receivers 312 and 322. As discussed above, the first receiver 312 includes first frequency converter 316 for converting the frequency of the DUT signal from the DUT 111 to an intermediate frequency in response to the LO signal, first ADC 114 for digitizing the frequency converted DUT signal, and first demodulator 216 for demodulating the digitized DUT signal in response to the demodulation signal. The second receiver 322 includes second frequency converter 326 for converting the frequency of the second RF signal to the intermediate frequency in response to the LO signal, second ADC 124 for digitizing the frequency converted second RF signal, and second demodulator 226 for demodulating the digitized second RF signal in response to the demodulation signal. The second receiver 322 further includes first path delay compensator 225 configured to compensate for the delay difference between the first path delay and the second path delay, although the functionality may be included in the first receiver 312 or split between the first and second receivers 312 and 322, as discussed above. The first receiver unit 401 further includes subtractor 206 for effectively subtracting the delay compensated, demodulated digitized second RF signal from the demodulated digitized DUT signal to provide first delay compensated signal.

The second receiver unit 402 includes second LO 408 for generating an LO signal and second signal oscillator 409 for generating a demodulation signal for demodulators in the third and fourth receivers 332 and 342. The third receiver 332 includes third frequency converter 336 for converting the frequency of the DUT signal from the DUT 111 to an intermediate frequency in response to the LO signal, third ADC 134 for digitizing the frequency converted DUT signal, and third demodulator 236 for demodulating the digitized DUT signal in response to the demodulation signal. The fourth receiver 342 includes fourth frequency converter 346 for converting the frequency of the second RF signal to the intermediate frequency in response to the LO signal, fourth ADC 144 for digitizing the frequency converted second RF signal, and fourth demodulator 246 for demodulating the digitized second RF signal in response to the demodulation signal. The fourth receiver 342 further includes second path delay compensator 245 configured to compensate for the delay difference between the first path delay and the second path delay, although the functionality may be included in the third receiver 332 or split between the third and fourth receivers 332 and 342, as discussed above with reference to first and second receivers 312 and 322. The second receiver unit 402 further includes subtractor 406 for effectively subtracting the delay compensated, demodulated digitized second RF signal from the demodulated digitized DUT signal to provide second delay compensated signal.

As discussed above, the test system 400 is configured to perform cross-correlation between the first delay compensated signal output by the first receiver unit 401 and the second delay compensated signal output by the second receiver unit 402. This is done by the processing unit 130, which inputs the first and second delay compensated signals, and perform the cross-correlation, for example, by multiplying the first delay compensated signal by the complex conjugate of the second delay compensated signal in the frequency domain. The cross-correlated signal is substantially free of noise introduced by the internal components of the first and second receiver units 401 and 402, including the first and second LOs 308 and 408, as well as uncanceled LO noise introduced by the first and second LOs 308 and 408 caused as a side-effect of the path delay compensation performed by the first and second path delay compensators 225 and 245.

Figure 5:
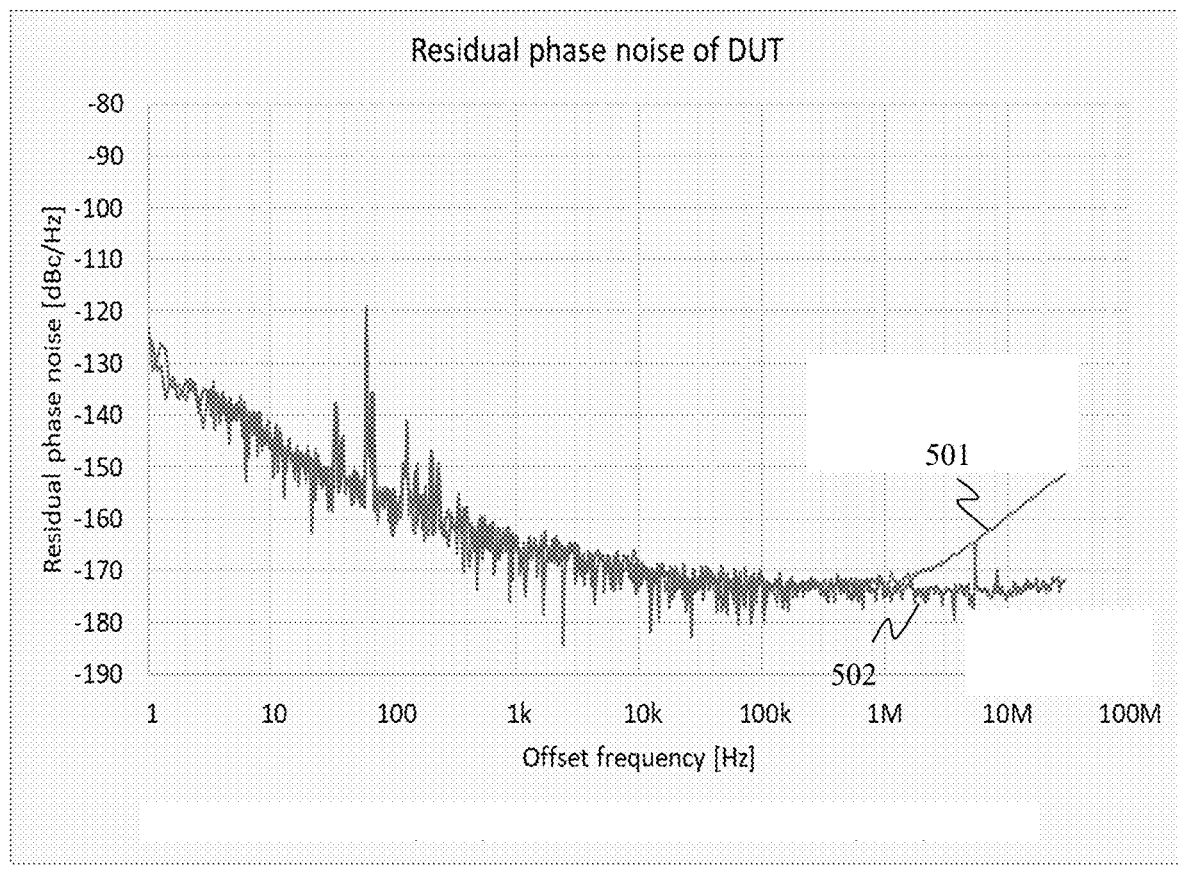
FIG. 5 is as graph showing measurements of residual phase noise of a DUT signal without and with delay compensation, according to a representative embodiment.

FIG. 5 is as graph showing measurements of residual phase noise of a DUT signal without and with delay compensation, according to a representative embodiment. Referring to FIG. 5, trace 501 shows the residual phase noise of the DUT signal in dBc/Hz without delay compensation, where residual phase noise increases significantly at higher offset frequencies, beginning at about 1 MHz. In comparison, trace 502 shows the residual phase noise of the DUT signal in dBc/Hz with delay compensation, according to a representative embodiment, where the residual phase noise continues to decline and then remains substantially flat at offset frequencies at and above about 1 MHz.

Notably, in the systems discussed above for canceling signal source noise when measuring residual noise with path delay compensation, the difference in the delay of the first and second paths, represented by path delay 121 in FIGS. 1-4, should be provided in advance. The improvement of the source noise cancelation by the path delay compensation directly depends on how accurately the delay difference is represented. In other words, the greater the error in the delay difference provided to the system, the less effective the signal source noise cancelation will be.

Conventionally, the respective path delays and the corresponding delay difference may be estimated based on the electrical lengths of cables used in the first and second paths. However, such estimation does not consistently provide sufficient accuracy for performing effective path delay compensation. For more accuracy, a test instruments, such as vector network analyzers (VNAs), may be used to measure the respective path delays. However, use of such instruments tends to be time consuming in that the devices and cables involved need to be connected to the VNA and then reconnected for performing the residual noise measurement of the DUT. Also, the delay measurement by a VNA is not done under the same conditions as the subsequent residual noise measurement. Source and load match, input power and nonlinearity of the DUT will cause error of measured delay. Accordingly, a calibration system is needed to perform an accurate determination of the delay difference between paths.

Figure 6:
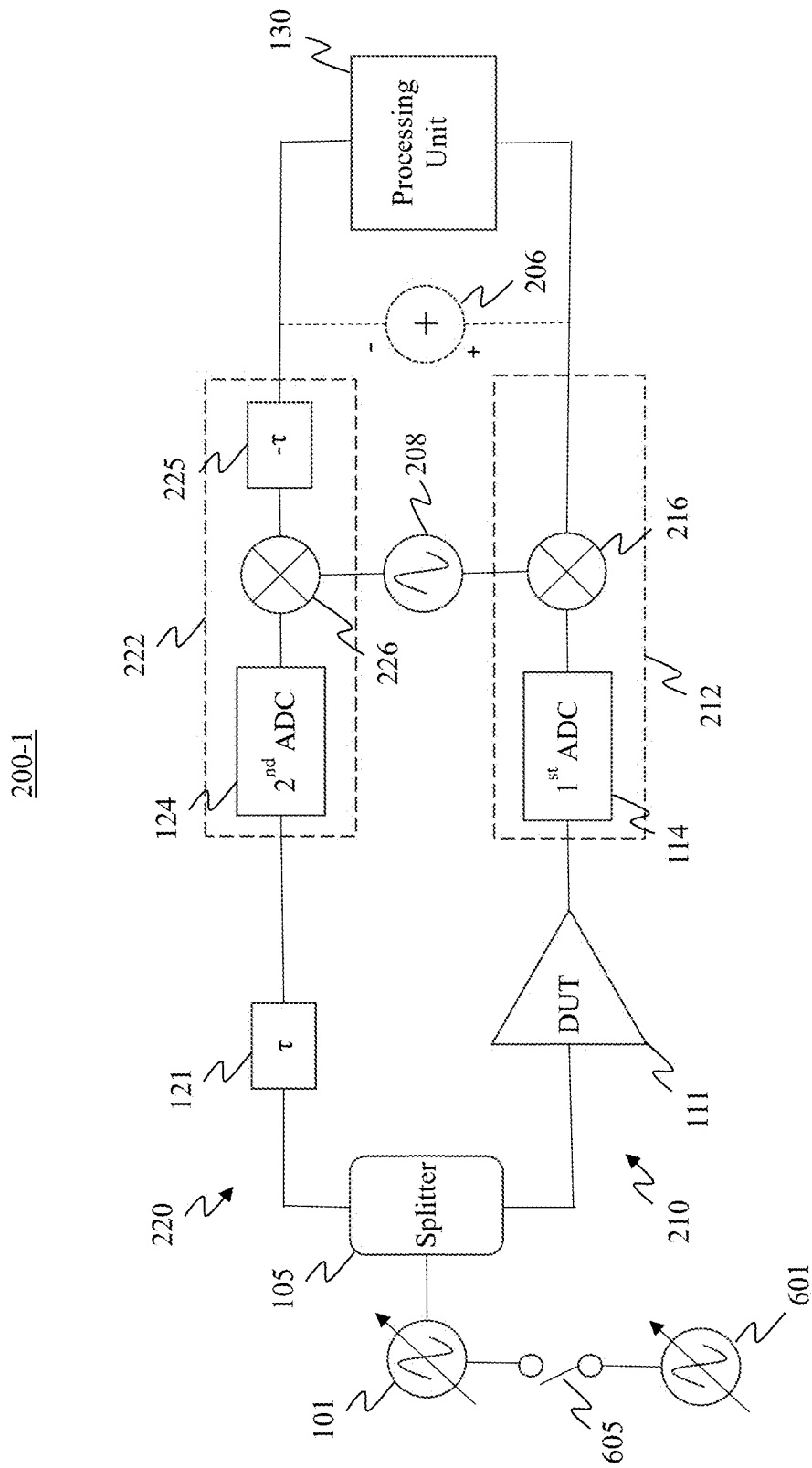
FIG. 6 is a simplified block diagram of a system for calibrating a system for canceling signal source noise when measuring residual noise of a DUT, according to a representative embodiment.

FIG. 6 is a simplified block diagram of a calibration system for calibrating a system for canceling signal source noise when measuring residual noise of a DUT, according to a representative embodiment.

Referring to FIG. 6, calibration system 200-1 is substantially the same as the test system 200, discussed above, with the addition of a modulation source 601 connectable to the signal source 101 through operation of a calibration switch 605. The modulation source 601 is configured to provide a phase modulation signal to the signal source 101 to generate a phase modulated RF signal for initially calibrating the test system 200, as well as the test systems 300 and 400, discussed above. The calibration determines the delay difference (t) between the first path delay in the first path 210 and the second path delay in the second path 220 with the DUT 111 included in the first path 210 during the calibration and subsequent measurement of residual noise. The calibration is therefore done under actual measurement conditions, including the operating conditions of the DUT 111.

The phase modulation signal provided by the modulation source 601 is indicated by $\phi_{CAL} \sin \omega_M t$, where $\omega_M = 2\pi f_M$ where $f_M$ is modulation frequency. In the depicted embodiment, a calibration switch 605 is configured to selectively connect the modulation source 601 to the signal source 101. Although the modulation source 601 is depicted separate from the signal source 101, it is understood that the functionality of the modulation source 601 may be incorporated into the signal source 101 when the signal source 101 is capable of providing the phase modulation signal itself for generating the phase modulated RF signal. For example, when the signal source 101 comprises an AWG, it is able to generate the phase modulated RF signal itself.

When the modulation source 601 provides the phase modulation signal to the signal source 101, e.g., when the calibration switch 605 is closed, the signal source 101 outputs an RF signal that is phase modulated at the modulation frequency ($f_M$) to provide a phase modulated RF signal. The signal splitter 105 divides the phase modulated RF signal into a phase modulated first RF signal directed to the first path 210 and a phase modulated second RF signal directed to the second path 220. The phase modulated first RF signal is input as a stimulus signal to the DUT 111, which outputs a phase modulated DUT signal in response. The first ADC 114 in the first receiver 212 digitizes the phase modulated DUT signal to output a digitized phase modulated DUT signal. The second ADC 124 in the second receiver 222 digitizes the phase modulated second RF signal to output a digitized phase modulated second RF signal.

The calibration system 200-1 further includes signal oscillator 208, first demodulator 216 following the first ADC 114 in the first receiver 212, and second demodulator 226 following the second ADC 124 in the second receiver 222. The first demodulator 216 demodulates the digitized phase modulated DUT signal to baseband in response to the demodulation signal, and the second demodulator 226 demodulates the digitized phase modulated second RF signal to baseband in response to the demodulation signal, as discussed above.

The subtractor 206 is disconnected during the calibration, indicated by the dotted line. Therefore, the digitized phase modulated DUT signal and the digitized phase modulated second RF signal are provided to the processing unit 130 without being subtracted to remove the phase modulation signal from the digitized phase modulated DUT signal.

The calibration system 200-1 is initially calibrated by setting the path delay compensation provided by the path delay compensator 225 to zero by the processing unit 130. The processing unit 130 then measures first phase of the digitized phase modulated DUT signal from the first path 210 and second phase of the digitized phase modulated second RF signal from the second path 220, and accurately calculates the delay difference (t) between the first path delay and the second path delay according to Equation (9):

$$\tau = \frac{\sin^{-1}\left(\frac{\phi_2}{|\phi_2|}\right) - \sin^{-1}\left(\frac{\phi_1}{|\phi_1|}\right)}{2\pi f_M} \quad (9)$$

In Equation (9), $\phi_1$ is the measured first phase of the phase modulated DUT signal that passes through the first path 210, and $\phi_2$ is the measured second phase of the phase modulated second RF signal that passes through the second path 220.

The modulation source 601 is then removed from the calibration system 200-1, e.g., by opening the calibration switch 605, and the subtractor 206 is reconnected between the first and second paths 210 and 220, so that the calibration system 200-1 effectively becomes the test system 200. The path delay compensator 225 is set to the delay difference (t) as calculated during the calibration by the processing unit 130. The test system 200 is then able to accurately measure the residual noise of a DUT 111 by canceling the signal source noise of the signal source 101, as discussed above, using the calibrated delay difference (t).

Figure 7:
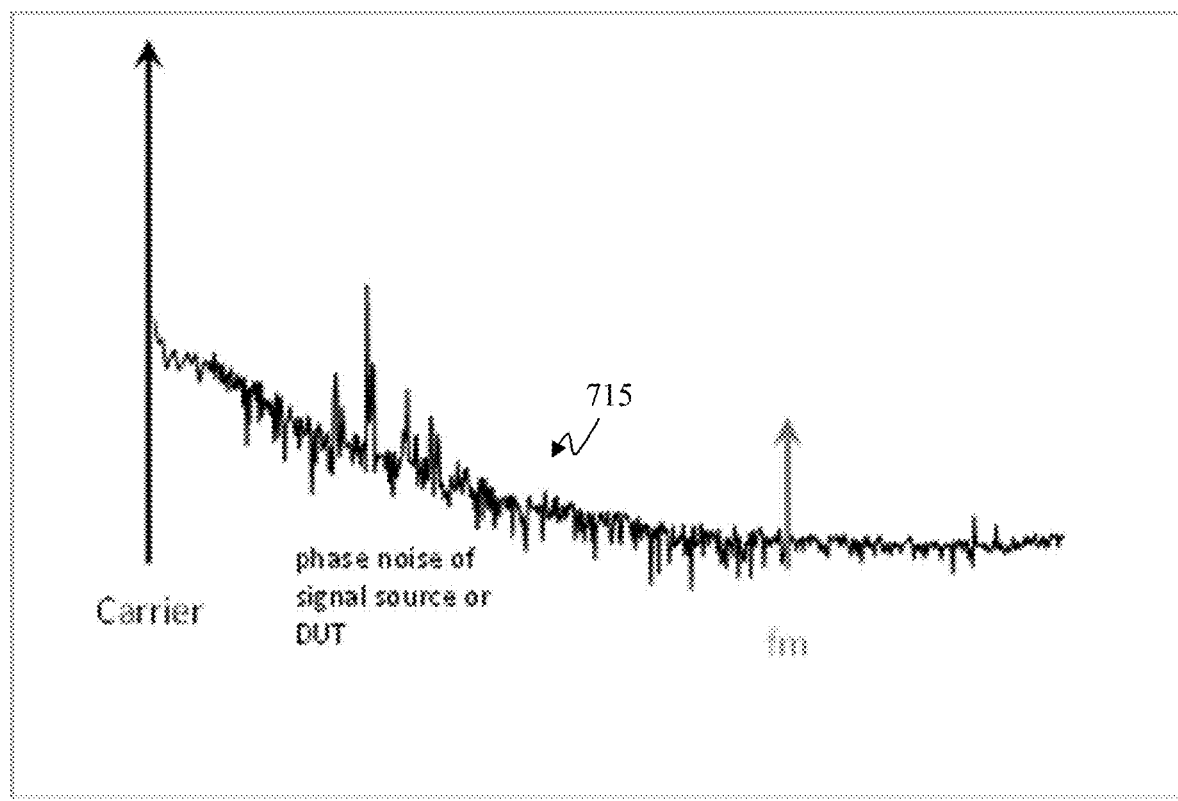
FIG. 7 is a graph showing a modulation signal used for calibration, according to a representative embodiment.

The amount of the phase modulation is $\phi_{CAL}$, which gives the magnitude of the phase modulation signal, should be small enough compared to carrier power not to change the operation condition and should be large enough that the signal source noise of the signal source 101 and the residual noise of the DUT 111 may be negligible. In this context, FIG. 7 is a graph showing a modulation signal used for calibration, according to a representative embodiment. Trace 715 shows the phase noise being measured. An arrow indicates frequency of the phase modulation signal of the modulation frequency $f_M$ having the magnitude indicated by $\phi_{CAL}$, mentioned above.

Figure 8:
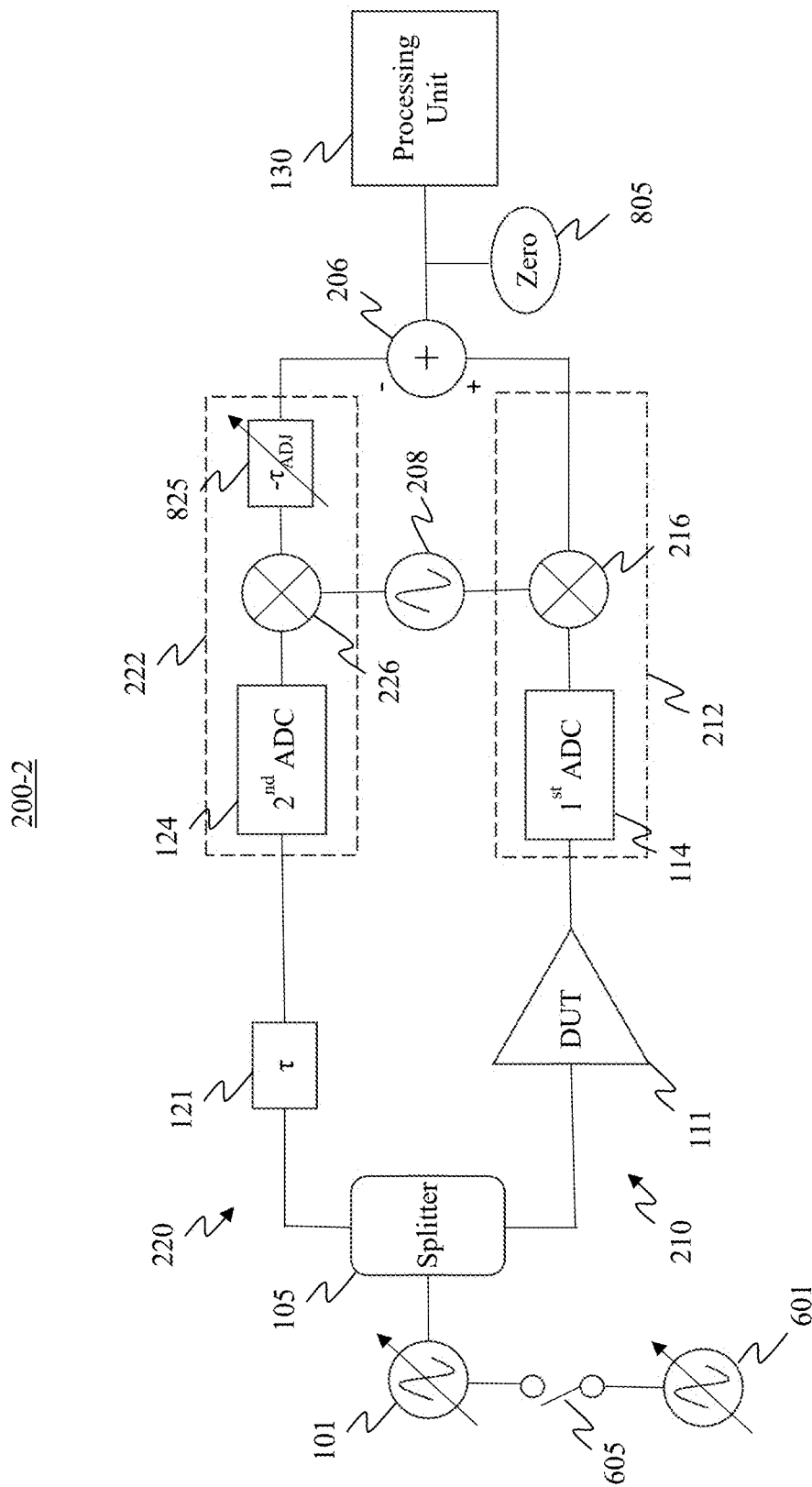
FIG. 8 is a simplified block diagram of a system for calibrating a system for canceling signal source noise when measuring residual noise of a DUT, according to a representative embodiment.

FIG. 8 is a simplified block diagram of another calibration system for calibrating a system for canceling signal source noise when measuring residual noise of a DUT, according to a representative embodiment.

Referring to FIG. 8, like calibration system 200-1, calibration system 200-2 is substantially the same as the test system 200, discussed above, with the addition of the modulation source 601 connectable to the signal source 101. The modulation source 601 is configured to provide phase modulation signal to the signal source 101 to generate a phase modulated RF signal for initially calibrating the test system 200, as well as the test systems 100, 300, and 400, discussed above. The calibration determines the delay difference (t) between the first path delay in the first path 210 and the second path delay in the second path 220 with the DUT 111 included in the first path 210 during the calibration and subsequent measurement of residual noise. The calibration is therefore done under actual measurement conditions, including the operating conditions of the DUT 111.

When the modulation source 601 provides a phase modulation signal to the signal source 101, e.g., when the calibration switch 605 is closed, the signal source 101 outputs an RF signal that is phase modulated at the modulation frequency ($f_M$) to provide a phase modulated RF signal. The signal splitter 105 divides the phase modulated RF signal into phase modulated first RF signal directed to the first path 210 and phase modulated second RF signal directed to the second path 220. The phase modulated first RF signal is input as a stimulus signal to the DUT 111, which outputs a phase modulated DUT signal in response. In the first receiver 212, the first ADC 114 digitizes the phase modulated DUT signal to output a digitized phase modulated DUT signal, and the first demodulator 216 demodulates the digitized phase modulated DUT signal to baseband in response to the demodulation signal generated by the signal oscillator 208. In the second receiver 222, the second ADC 124 digitizes the phase modulated second RF signal to output a digitized phase modulated second RF signal, and the second demodulator 226 demodulates the digitized phase modulated second RF signal to baseband in response to the demodulation signal generated by the signal oscillator 208.

The calibration system 200-2 further includes subtractor 206, which is configured to subtract the digitized phase modulated DUT signal from the first path 210 and the digitized phase modulated second RF signal from the second path 220 to remove the modulation signal from the DUT signal. For the sake of convenience, the first path delay is assumed to be zero, such that the second path delay, indicated by path delay 121, is equal to the delay difference (t).

The output of the subtractor 206 is provided to the processing unit 130 and a zero detector 805, for purposes of calibration. The zero detector 805 is configured to detect when delay compensation applied during the calibration results is zero delay difference between the first and second path delays by measuring the magnitude of a residual modulation signal after subtraction by the subtractor 206. An adjustable path delay compensator 825, shown in the second receiver 222, is configured to adjust the delay difference between the first path delay through the first path 210 and the second path delay through the second path 220 until the delay difference equals zero, as detected by zero detector 805. To this end, the compensation setting of the path delay compensator 825 is adjusted by the processing unit 130. That is, the processing unit 130 receives the delay difference signal from the zero detector 805 and adjusts a compensation setting of the path delay compensator 825 until the delay difference signal indicates no difference between the first path delay and the second path delay. The compensation setting of the path delay compensator 825 when the delay difference is detected to be zero becomes the calibrated delay difference ($\tau$).

Following calibration, the modulation source 601 is removed from the calibration system 200-2, e.g., by opening the calibration switch 605, and the path delay compensator 825 set to the calibrated delay difference (t), so that the calibration system 200-2 effectively becomes the test system 200. The test system 200 is then able to cancel the signal source noise of the signal source 101, as discussed above, in order to accurately measure the residual noise of a DUT 111, as discussed above, using the calibrated delay difference (t). Both the calibration system 200-1 and the calibration system 200-2 can determine the delay difference even when the delay is not flat over offset frequency from the carrier frequency of the RF signal to repeat the calibration changing the modulation frequency in the frequency range of interest.

Figure 9A:
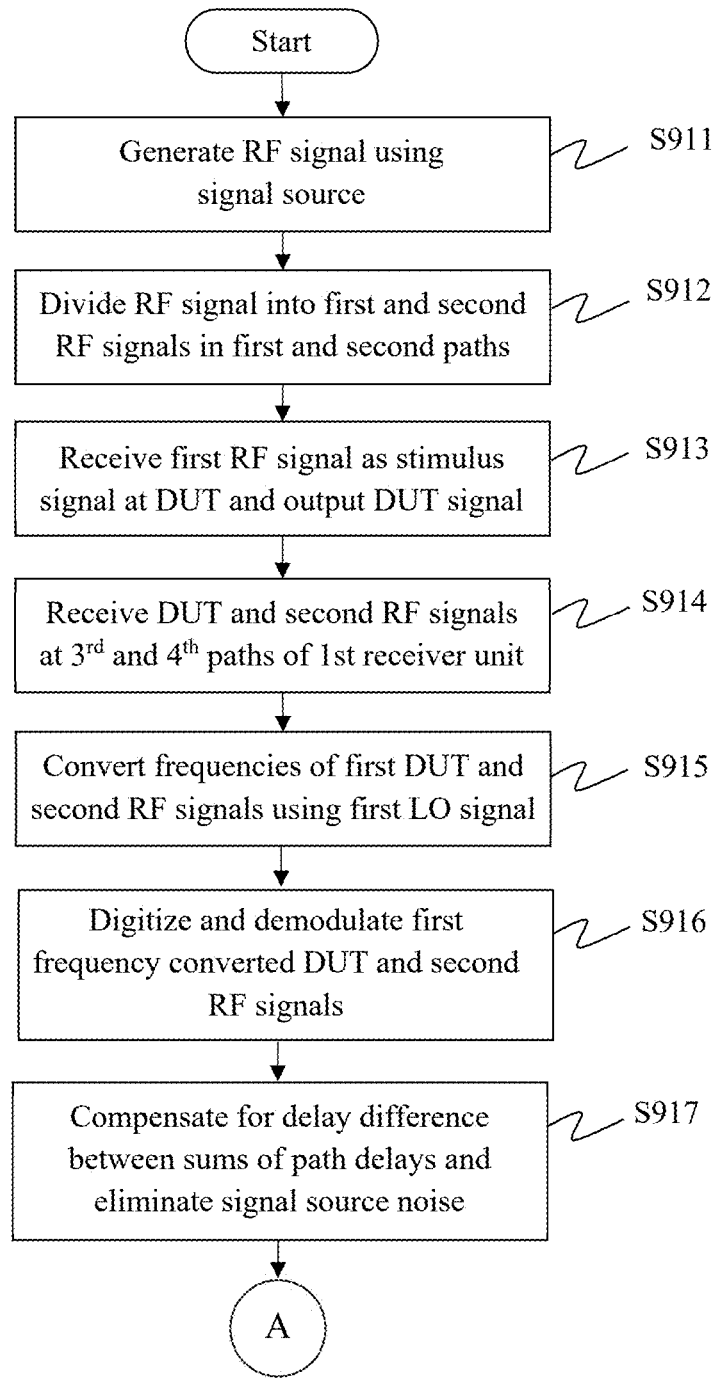
FIG. 9A is a flow diagram showing a method of canceling signal source noise when measuring residual noise of a DUT, including frequency conversion using a local oscillator, according to a representative embodiment.
Figure 9B:
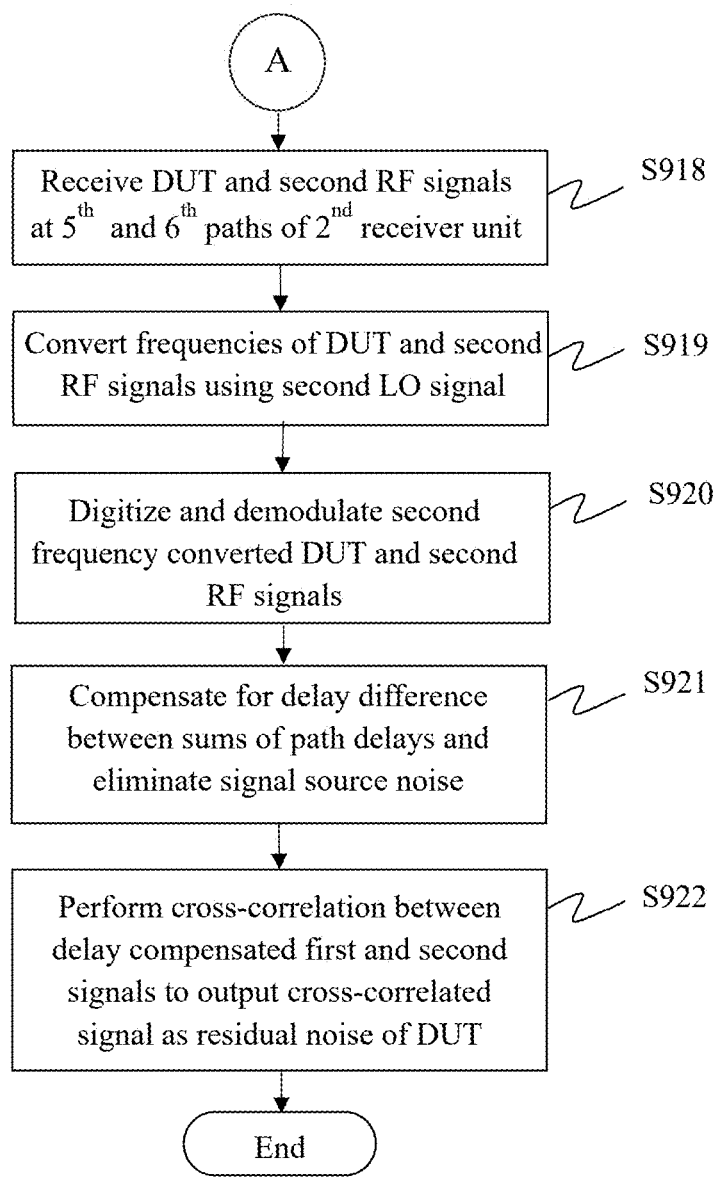
FIG. 9B is a continuation of the flow diagram showing a method of canceling signal source noise when measuring residual noise of a DUT, including frequency conversion using a local oscillator, according to a representative embodiment.

FIGS. 9A and 9B provide a flow diagram showing a method of canceling signal source noise when measuring residual noise of a DUT, including frequency conversion using a local oscillator, according to a representative embodiment. The steps of FIGS. 9A and 9B may be performed all or in part by the test systems discussed above, including the processing unit 130.

Referring to FIG. 9A, an RF signal is generated using a signal source in block S911. The RF signal includes signal source noise introduced by the signal source.

In block S912, the RF signal is divided into a first RF signal in a first path and a second RF signal in a second path. The first path introduces a first path delay and the second path introduces a second path delay.

In block S913, the first RF signal is received at the DUT in the first as a stimulus signal. The DUT outputs a DUT signal in response to the stimulus signal.

In block S914, the DUT signal is received at a third path and the second RF signal is received at a fourth path of a first receiver unit. The third path introduces a third path delay and the fourth path introduces a fourth path delay.

In block S915, a frequency of the DUT signal is converted using a first local oscillator (LO) signal generated by a first LO to provide a first frequency converted DUT signal. Also, a frequency of the second RF signal is converted using the first LO signal to a first frequency converted second RF signal. The first LO introduces first LO noise in each of the first frequency converted DUT signal and the first frequency converted RF signal.

In block S916, the first frequency converted DUT signal and the first frequency converted second RF signal are digitized and demodulated in the third and fourth paths, respectively, to provide a first demodulated digitized DUT signal and a first demodulated digitized second RF signal.

In block S917, a delay difference between a sum of the first and third path delays and a sum of the second and fourth path delays is compensated for, and the first demodulated digitized DUT signal and the first demodulated digitized second RF signal are subtracted following the delay compensation to eliminate the signal source noise. The first receiver unit thus outputs a delay compensated first signal, which includes first residual noise of the DUT (including the first LO noise) without the signal source noise.

Referring to FIG. 9B, the DUT signal is received at a fifth path and the second RF signal is received at a sixth path of a second receiver unit in block S918. The fifth path introduces a fifth path delay and the sixth path introduces a sixth path delay.

In block S919, a frequency of the DUT signal is converted using a second LO signal generated by a second LO in block S919 to provide a second frequency converted DUT signal. Also, a frequency of the second RF signal is converted using the second LO signal to a second frequency converted second RF signal. The second LO introduces second LO noise in each of the second frequency converted DUT signal and the second frequency converted RF signal.

In block S920, the second frequency converted DUT signal and the second frequency converted second RF signal are digitized and demodulated in the fifth and sixth paths, respectively, to provide a second demodulated digitized DUT signal and a second demodulated digitized second RF signal.

In block S921, a delay difference between a sum of the first and fifth path delays and a sum of the second and sixth path delays is compensated for, and the second demodulated digitized DUT signal and the second demodulated digitized second RF signal are subtracted following the delay compensation to eliminate the signal source noise. The second receiver unit thus outputs a delay compensated second signal, which includes second residual noise of the DUT (including the second LO noise) without the signal source noise.

In block S922, cross-correlation is performed between the delay compensated first signal and the delay compensated second signal. Performing the cross-correlation eliminates the first and second LO noise to output the cross-correlated signal as the residual noise of the DUT.

Figure 10:
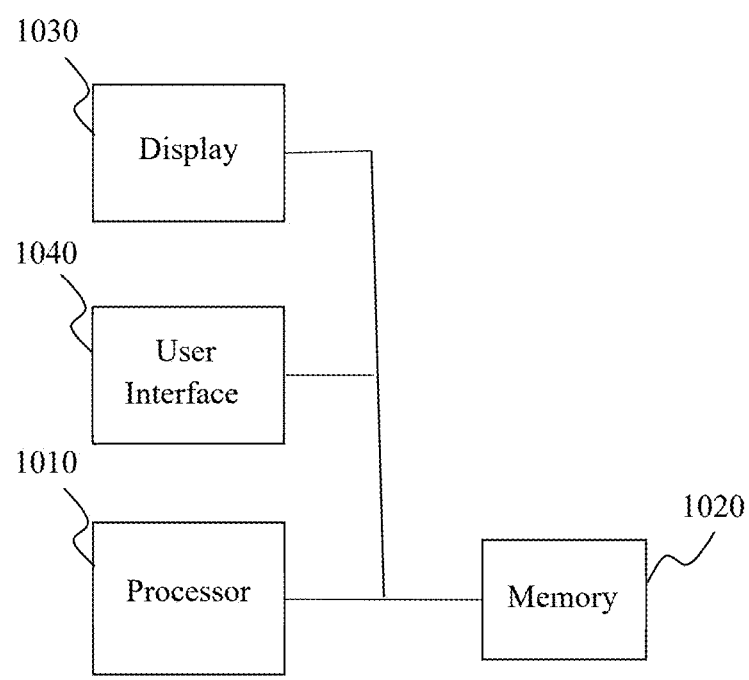
FIG. 10 is a simplified block diagram of a representative processing unit, according to a representative embodiment.

FIG. 10 is a simplified block diagram of a representative processor unit, such as the processing unit 130 in FIGS. 1-4, 6 and 8, according to a representative embodiment.

Referring to FIG. 10, processing unit 130 includes a processor 1010, memory 1020 for storing instructions executable by the processor 1010 to implement the processes described herein, as well as a display 1030 and an interface 1040 to enable user interaction.

The processor 1010 is representative of one or more processing devices, and is configured to execute software instructions to perform functions as described in the various embodiments herein. The processor 1010 may be implemented by a general purpose computer, a central processing unit, one or more processors, microprocessors or microcontrollers, a state machine, a programmable logic device, field programmable gate arrays (FPGAs), application specific integrated circuits (ASICs), or combinations thereof, using any combination of hardware, software, firmware, hard-wired logic circuits, or combinations thereof. The term "processor" encompasses an electronic component able to execute a program or machine executable instructions. References to a processor should be interpreted to include more than one processor or processing core, as in a multi-core processor, and/or parallel processors. Programs have software instructions performed by one or multiple processors that may be within the same computing device or which may be distributed across multiple computing devices.

The memory 1020 is a tangible storage medium for storing data and executable software instructions, and is non-transitory during the time software instructions are stored therein, and may communicate with each other and the processor 1010 via one or more buses. The memory 1020 stores instructions used to implement some or all aspects of methods and processes described herein, including the methods described above with reference to FIGS. 9A and 9B, for example. The memory 1020 may be implemented by any number, type and combination of random access memory (RAM) and read-only memory (ROM), for example, and may store various types of information, such as software algorithms and computer programs, all of which are executable by the processor 1010. The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, blu-ray disk, a universal serial bus (USB) drive, or any other form of storage medium known in the art.

The display 1030 may be a monitor such as a computer monitor, a television, a liquid crystal display (LCD), an organic light emitting diode (OLED), a flat panel display, a solid-state display, or a cathode ray tube (CRT) display, or an electronic whiteboard, for example. The display 1030 may also provide a graphical user interface (GUI) for displaying and receiving information to and from the user.

The interface 1040 may include a user and/or network interface for providing information and data output by the processor 1010 and/or the memory 1020 to the user and/or for receiving information and data input by the user. That is, the interface 1040 enables the user to enter data and to control or manipulate aspects of the processes described herein, and also enables the processor 1010 to indicate the effects of the user's control or manipulation. The interface 1040 may connect one or more user interfaces, such as a mouse, a keyboard, a mouse, a trackball, a joystick, a haptic device, a microphone, a video camera, a touchpad, a touchscreen, voice or gesture recognition captured by a microphone or video camera, for example, or any other peripheral or control to permit user feedback from and interaction with the processor 1010. The interface 1040 may further include one or more of ports, disk drives, wireless antennas, or other types of receiver circuitry.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A system for canceling signal source noise when measuring residual noise of a device under test (DUT), the system comprising:
  a signal source configured to generate a radio frequency (RF) signal having signal source noise, and to selectively provide a phase modulated RF signal for initially performing a calibration of the system including the DUT;
  a signal splitter configured to divide the RF signal into a first RF signal in a first path and a second RF signal in a second path,
    wherein the first path introduces a first path delay, and comprises the DUT configured to receive the first RF signal as a stimulus signal and to output a DUT signal in response; a first analog to digital converter (ADC) configured to digitize the DUT signal; and a first demodulator configured to demodulate the digitized DUT signal to provide a demodulated digitized DUT signal including the signal source noise of the RF signal and the residual noise of the DUT, and
    wherein the second path introduces a second path delay, and comprises a second ADC configured to digitize the second RF signal; and a second demodulator configured to demodulate the digitized second RF signal to provide a demodulated digitized second RF signal;
  a path delay compensator configured to compensate for a delay difference between the first path delay and the second path delay;
  a subtractor configured to subtract the demodulated digitized DUT signal and the demodulated digitized second RF signal following the compensation for the delay difference to output a delay compensated signal including the residual noise of the DUT without the signal source noise; and
  a processor configured to initially perform the calibration of the system in response to the phase modulated RF signal with the DUT in the first path to determine the delay difference between the first path delay and the second path delay, and subsequently to measure the residual noise of the DUT from the delay compensated signal using the delay difference.

2. The system of claim 1, wherein the second path further comprises another DUT before the second ADC, wherein the another DUT is configured to receive the second RF signal as a stimulus signal and to output another DUT signal in response, wherein the another DUT signal is input to the second ADC as the second RF signal.

3. The system of claim 1, further comprising:
  a local oscillator (LO) configured to generate an LO signal, wherein:
  the first path further comprises a first frequency converter configured to convert a frequency of the DUT signal using the LO signal to provide a frequency converted DUT signal to input the ADC, and
  the second path further comprises a second frequency converter configured to convert a frequency of the second RF signal using the LO signal to provide a frequency converted second RF signal to input the ADC.

4. The system of claim 1, wherein the processor is configured to initially perform the calibration of the system by:
  setting compensation delay provided by the path delay compensator to zero;
  measuring first phase and second phase of the phase modulated RF signal that passes through the first path and the second path, respectively; and
  calculating the delay difference between the first path delay and the second path delay based on the measured first phase of the phase modulated RF signal that passes through the first path and the measured second phase of the phase modulated RF signal that passes through the second path.

5. The system of claim 4, wherein the processor is configured to calculate the delay difference (t) between the first path delay and the second path delay as follows:

$$\tau = \frac{\sin^{-1}\left(\frac{\phi_2}{|\phi_2|}\right) - \sin^{-1}\left(\frac{\phi_1}{|\phi_1|}\right)}{2\pi f_M}$$

wherein $f_M$ is modulation frequency of the phase modulated RF signal generated by the signal source, $\phi_1$ is the measured first phase of the phase modulated RF signal that passes through the first path, and $\phi_2$ is the measured second phase of the phase modulated RF signal that passes through the second path.

6. The system of claim 1, further comprising a zero detector connected to an output of the subtractor, wherein:
  the subtractor subtracts a phase modulated DUT signal from the first path and a phase modulated second RF signal from the second path following the compensation for the delay difference to output a delay difference signal,
  the zero detector detects when the delay difference signal is zero, and
  the processor is configured to initially perform the calibration of the system by receiving the delay difference signal from the zero detector and adjusting the path delay compensator until the delay difference signal indicates no difference between the first path delay and the second path delay.

7. The system of claim 1, wherein the path delay compensator compensates for the delay difference between the first path delay and the second path delay by:
  calculating compensation phase $\theta$ according to $\theta = 2\pi f_m t$, where $f_m$ is offset frequency from a carrier frequency of the RF signal and $\tau$ is the delay difference between the first and second path delays; and
  subtracting the compensation phase $\theta$ from the demodulated digitized second RF signal.

8. The system of claim 1, further comprising:
a modulation source configured to provide a phase modulation signal to the signal source to enable the signal source to provide the phase modulated RF signal for initially performing the calibration of the system.

9. The system of claim 8, further comprising:
a calibration switch configured to selectively connect the modulation source to the signal source for providing the phase modulation signal to the signal source for initially performing the calibration, and to selectively disconnect the modulation source from the signal source for subsequently measuring the residual noise of the DUT following the calibration.

10. A system for canceling signal source noise when measuring residual noise of a device under test (DUT), the system comprising:
a signal source configured to generate a radio frequency (RF) signal having signal source noise;
a signal splitter configured to divide the RF signal into a first RF signal in a first path and a second RF signal in a second path, wherein the first path introduces a first path delay and the second path introduces a second path delay, and wherein the first path includes the DUT configured to receive the first RF signal as a stimulus signal and to output a DUT signal in response;
a first receiver unit comprising a third path configured to receive the DUT signal from the first path and a fourth path configured to receive the second RF signal from the second path, wherein the third path introduces a third path delay and the fourth path introduces a fourth path delay, and wherein the first receiver unit is configured to compensate for a delay difference between a sum of the first and third path delays and a sum of the second and fourth path delays and to eliminate the signal source noise to output a delay compensated first signal including first residual noise of the DUT without the signal source noise;
a second receiver unit comprising a fifth path configured to receive the DUT signal from the first path and a sixth path configured to receive the second RF signal from the second path, wherein the fifth path introduces a fifth path delay and the sixth path introduces a sixth path delay, and wherein the second receiver unit is configured to compensate for a delay difference between a sum of the first and fifth path delays and a sum of the second and sixth path delays and to eliminate the signal source noise to output a delay compensated second signal including second residual noise of the DUT without the signal source noise; and
a processor configured to perform cross-correlation of the delay compensated first signal and the delay compensated second signal to provide a cross-correlated signal, and to measure the residual noise of the DUT from the cross-correlated signal.

11. The system of claim 10, wherein the first receiver unit further comprises a first local oscillator (LO) configured to generate a first LO signal, wherein the third path comprises a first frequency converter configured to convert a frequency of the DUT signal using the first LO signal to output a first frequency converted DUT signal, and wherein the fourth path comprises a second frequency converter configured to convert a frequency of the second RF signal using the first LO signal to output a first frequency converted RF signal; and
wherein the second receiver unit further comprises a second LO configured to generate a second LO signal, wherein the fifth path comprises a third frequency converter configured to convert the frequency of the DUT signal using the second LO signal to output a second frequency converted DUT signal, and wherein the sixth path comprises a fourth frequency converter configured to convert the frequency of the second RF signal using the second LO signal to output a second frequency converted RF signal.

12. The system of claim 11, wherein the processor is further configured to reduce first LO noise contribution added to the DUT signal by the first and second LOs, and to reduce second LO noise contribution added to the second RF signal by the first and second LOs, as a side-effect of delay compensation, by averaging the cross-correlation of the delay compensated first and second signals.

13. The system of claim 11, wherein in the first receiver unit:
the third path further comprises a first analog to digital converter (ADC) configured to digitize the first frequency converted DUT signal to provide a first digitized DUT signal; and a first demodulator configured to demodulate the first digitized DUT signal to provide a first demodulated DUT signal, and
the fourth path further comprises a second ADC configured to digitize the first frequency converted RF signal to provide a first digitized RF signal; and a second demodulator configured to demodulate the first digitized RF signal to provide a first demodulated RF signal, and
wherein in the second receiver unit:
the fifth path further comprises a third ADC configured to digitize the second frequency converted DUT signal to provide a second digitized DUT signal; and a third demodulator configured to demodulate the second digitized DUT signal to provide a second demodulated DUT signal, and
wherein the sixth path further comprises a fourth ADC configured to digitize the second frequency converted RF signal to provide a second digitized RF signal; and a fourth demodulator configured to demodulate the second digitized RF signal to provide a second demodulated RF signal.

14. The system of claim 13, wherein the first receiver unit further comprises a first path delay compensator configured to compensate for the delay difference between the sum of the first and third path delays and the sum of the second and fourth path delays, and a first subtractor configured to subtract the first demodulated DUT signal and the first demodulated RF signal following the compensation for the delay difference to output the delay compensated first signal including the first residual noise of the DUT without the signal source noise, and
wherein the second receiver unit further comprises a second path delay compensator configured to compensate for a delay difference between the sum of the first and fifth path delays and the sum of the second and sixth delays, and a second subtractor configured to subtract the second demodulated DUT signal and the second demodulated RF signal following the compensation for the delay difference to output the delay compensated second signal including the second residual noise of the DUT without the signal source noise.

15. The system of claim 10, further comprising:
a modulation source selectively connected to the signal source for providing phase modulation to the signal source for initially performing a calibration the system including the DUT in the first path, wherein the signal source outputs the RF signal phase modulated by the modulation source at a modulation frequency to provide a phase modulated RF signal during the calibration.

16. A method for canceling signal source noise when measuring residual noise of a device under test (DUT), the method comprising:

generating a radio frequency (RF) signal having signal source noise using a signal source;

dividing the RF signal into a first RF signal in a first path and a second RF signal in a second path, wherein the first path introduces a first path delay and the second path introduces a second path delay;

receiving the first RF signal as a stimulus signal at the DUT in the first path, wherein the DUT outputs a DUT signal in response;

receiving the DUT signal at a third path and the second RF signal at a fourth path of a first receiver unit, wherein the third path introduces a third path delay and the fourth path introduces a fourth path delay;

converting a frequency of the DUT signal using a first local oscillator (LO) signal generated by a first LO to a first frequency converted DUT signal, and a frequency of the second RF signal using the first LO signal to a first frequency converted RF signal, wherein the first LO introduces first LO noise;

compensating for a first delay difference between a sum of the first and third path delays and a sum of the second and fourth path delays and eliminate the signal source noise to output a delay compensated first signal including first residual noise of the DUT without the signal source noise;

receiving the DUT signal at a fifth path and the second RF signal at a sixth path of a second receiver unit, wherein the fifth path introduces a fifth path delay and the sixth path introduces a sixth path delay;

converting a frequency of the DUT signal using a second LO signal generated by a second LO to a second frequency converted DUT signal, and a frequency of the second RF signal using the second LO signal to a second frequency converted RF signal, wherein the second LO introduces second LO noise;

compensating for a second delay difference between a sum of the first and fifth path delays and a sum of the second and sixth path delays and eliminate the signal source noise to output a delay compensated second signal including second residual noise of the DUT without the signal source noise;

performing cross-correlation of the delay compensated first signal and the delay compensated second signal to provide a cross-correlated signal, eliminating the first and second LO noise; and outputting the cross-correlated signal as the residual noise of the DUT.

17. The method of claim 16, further comprising:

digitizing and demodulating the first frequency converted DUT signal and the first frequency converted second RF signal before compensating for the first delay difference; and digitizing and demodulating the second frequency converted DUT signal and the second frequency converted second RF signal before compensating for the second delay difference.

18. The method of claim 16, further comprising:

initially performing a calibration with the DUT included in the first path by controlling the signal source to output a phase modulated RF signal at a modulation frequency, and determining the first and second delay differences using the phase modulated RF signal, during the calibration.

* * * * *